US008937266B2

(12) United States Patent
Feldhausen et al.

(10) Patent No.: US 8,937,266 B2
(45) Date of Patent: *Jan. 20, 2015

(54) SYSTEM AND METHOD FOR CONTROLLING AND COORDINATING WELDING-TYPE PROCESSES AND GOUGING-TYPE PROCESSES

(75) Inventors: Joseph E. Feldhausen, Appleton, WI (US); Jeffrey W. Rappold, Appleton, WI (US); Gary A. Thyssen, Appleton, WI (US); Craig S. Knoener, Appleton, WI (US); Christopher D. McInnis, Little Chute, WI (US); Brian A. Schwartz, Appleton, WI (US); Michael W. Hogan, Appleton, WI (US); Jeffrey P. Lenz, Appleton, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 686 days.

This patent is subject to a terminal disclaimer.

(21) Appl. No.: 12/035,751

(22) Filed: Feb. 22, 2008

(65) Prior Publication Data

US 2008/0203065 A1 Aug. 28, 2008

Related U.S. Application Data

(60) Provisional application No. 60/903,771, filed on Feb. 27, 2007.

(51) Int. Cl.
*B23K 9/10* (2006.01)
*B23K 9/173* (2006.01)
(Continued)

(52) U.S. Cl.
CPC ............... *B23K 9/013* (2013.01); *B23K 9/173* (2013.01); *B23K 28/02* (2013.01)

USPC .................................. 219/137 PS; 219/130.1

(58) Field of Classification Search
USPC ........................... 219/130.1, 132, 137 PS, 68
See application file for complete search history.

(56) References Cited

U.S. PATENT DOCUMENTS

| 282,816 A | 8/1883 | White |
|---|---|---|
| 3,529,127 A | 9/1970 | Smith |

(Continued)

FOREIGN PATENT DOCUMENTS

| EP | 1197289 | 4/2002 |
|---|---|---|
| EP | 1559496 | 8/2005 |

(Continued)

OTHER PUBLICATIONS

Idealarc DC-600, Multi-Process Welders, Publication E5.40, May 2005, www.lincolnelectric.com.

(Continued)

*Primary Examiner* — Henry Yuen
*Assistant Examiner* — Ayub Maye
(74) *Attorney, Agent, or Firm* — Quarles & Brady, LLP (57) ABSTRACT

A system and method for an integrated structural welding system includes a welding-type power source configured to deliver welding-type power for a variety of welding-type processes. The system also includes a gouging torch connected to the welding-type power source to receive welding-type power during a gouging-type process and a wire feeder connected to the welding-type power source to receive welding-type power during a welding-process. Furthermore, the system includes a controller configured to coordinate operation of the wire feeder, the gouging torch, and the power supply to perform only one of the gouging-type process and the welding-type process at a given time.

2 Claims, 5 Drawing Sheets

(51) Int. Cl.
*B23K 9/013* (2006.01)
*B23K 28/02* (2014.01)

(56) References Cited

U.S. PATENT DOCUMENTS

| | | | |
|---|---|---|---|
| 3,654,421 A | | 4/1972 | Armitstead et al. |
| 3,755,648 A | | 8/1973 | Rothman et al. |
| 4,009,685 A | * | 3/1977 | Sojka ............... 119/458 |
| 4,510,373 A | | 4/1985 | Cox |
| 4,628,181 A | | 12/1986 | Pan et al. |
| 4,659,904 A | | 4/1987 | Greineder |
| 4,757,849 A | | 7/1988 | Morris |
| 4,853,516 A | | 8/1989 | Julien et al. |
| 4,959,523 A | * | 9/1990 | Fihey et al. ............ 219/124.34 |
| 5,041,710 A | | 8/1991 | Hamal |
| 5,086,206 A | | 2/1992 | Hansen et al. |
| 5,097,108 A | | 3/1992 | Hamal |
| 5,841,105 A | * | 11/1998 | Haczynski et al. ...... 219/137.31 |
| 5,874,709 A | * | 2/1999 | New et al. .................. 219/137.9 |
| 6,051,806 A | | 4/2000 | Shikata et al. |
| 6,078,023 A | * | 6/2000 | Jones et al. ............. 219/137.63 |
| 6,137,080 A | | 10/2000 | Borchardt et al. |
| 6,390,389 B1 | | 5/2002 | Tudor et al. |
| 6,396,019 B1 | | 5/2002 | Williams |
| 6,479,795 B1 | | 11/2002 | Albrecht et al. |
| 6,596,972 B1 | | 7/2003 | Di Novo et al. |
| 6,707,000 B2 | | 3/2004 | Schneider et al. |
| 6,707,006 B1 | | 3/2004 | Myers |
| 6,742,719 B2 | | 6/2004 | Tudor et al. |
| 6,855,914 B1 | | 2/2005 | Kaufman et al. |
| 6,930,282 B1 | | 8/2005 | Di Novo et al. |
| 6,992,266 B1 | | 1/2006 | Di Novo et al. |
| 7,066,650 B2 | | 6/2006 | Ishihara |
| 7,105,777 B2 | | 9/2006 | Stava et al. |
| 7,176,411 B2 | | 2/2007 | Enyedy |
| 7,202,442 B2 | * | 4/2007 | Nakagiri et al. ........... 219/137.9 |
| 7,220,941 B2 | * | 5/2007 | Niedereder et al. .......... 219/132 |
| 7,241,973 B1 | | 7/2007 | Di Novo et al. |
| 7,294,808 B2 | * | 11/2007 | Furman et al. ................ 219/132 |
| 7,411,154 B2 | | 8/2008 | Fosbinder et al. |
| 7,624,908 B2 | | 12/2009 | Enyedy et al. |
| 7,642,487 B2 | | 1/2010 | Silvestro |
| 2003/0098383 A1 | | 5/2003 | Luo et al. |
| 2004/0026393 A1 | | 2/2004 | Matiash et al. |
| 2005/0199606 A1 | * | 9/2005 | Enyedy ..................... 219/137.7 |
| 2006/0027547 A1 | * | 2/2006 | Silvestro ..................... 219/133 |
| 2006/0104780 A1 | * | 5/2006 | Schottke ..................... 414/592 |
| 2006/0119059 A1 | | 6/2006 | O'Connor |
| 2006/0196862 A1 | | 9/2006 | Sickels |
| 2007/0122292 A1 | | 5/2007 | Etter et al. |
| 2007/0158323 A1 | | 7/2007 | Enyedy et al. |
| 2007/0296223 A1 | * | 12/2007 | Saylor ........................... 290/1 R |
| 2008/0156783 A1 | | 7/2008 | Vanden Heuvel et al. |
| 2008/0203066 A1 | | 8/2008 | Feldhausen et al. |

FOREIGN PATENT DOCUMENTS

| | | | |
|---|---|---|---|
| JP | 55040020 | | 3/1980 |
| KR | 20060010586 | * | 2/2006 ............ B23K 37/02 |
| KR | 1020060010586 | * | 2/2006 ............ B23K 37/02 |
| WO | 9834751 | | 8/1998 |
| WO | 9834781 | | 8/1998 |
| WO | WO 03/066267 | | 8/2003 |
| WO | WO 2006/082532 | | 8/2006 |

OTHER PUBLICATIONS

ISO MIG 4001 Synergic, PLASM, www.cebora.it/ing/prod/default.htm?50500.htm.
MIG, Sound MIG Pulse 2035/M, Inverter Technology, Cebora, www.cebora.it., Cadriano, Italy.
MIG, Sound MIG Synergic 4000/T, 5000T, Cebora, www.cebora.it., Cadriano, Italy.
MIG Sound MIG 2035/M, Instruction Manual for Wire Welding Machine.
Lincoln Electric, Power Wave F355i, Nextweld, Integrated Power Source for Factory Automation, Publication E10.80, Apr. 2003, www.lincolnelectric.com.
EUnited Robotic, European Robotics Association, ABB MigRob 500 inverter power source, www.eu-nited-robotics.net/node/69.
Millermatic 250 and Millermatic 250MP, Form No. DC/12.4, Miller Electric Company.
Millermatic Pulser, Literature No. DC/12.55, www.millerwelds.com.
MIG (GMAW), Millermatic 250X, Literature No. DC/12/49, www.millerwelds.com.
Miller Matic Gas Metal-Arc (MIG) Packages, Millermatic 35 and 35S, 70A and 80A Paks, 1976.
Millermatic 35, Form No. DC/12.4, 1982.
Miller Matic Gas Metal-Arc (MIG) Packages, Dip-Rigs, Dip Rig 200, 1976.
Miller, Dimension 652 and 812, Owner's Manual, wwwmillerwelds.com.
MillerMatic Gas Metal-Arc (MiG) Welding Equipment, Owner's Manual, pre dates Feb. 28, 2008.
MillerMatic A Complete Line of Wire Control/Feeders, Guns, Torches, Power Sources, Owner's Manual, Form: MMFC-9-70, pre dates Feb. 28, 2008.
Miller Matic 35 MiG Welding Package 150 AMPS 60% Duty Cycle, pre dates Feb. 28, 2008.

\* cited by examiner

SYSTEM AND METHOD FOR CONTROLLING AND COORDINATING WELDING-TYPE PROCESSES AND GOUGING-TYPE PROCESSES

REFERENCE TO RELATED APPLICATIONS

This application is based on provisional application Ser. No. 60/903,771, filed Feb. 27, 2007, and entitled "STRUCTURAL WELDING SYSTEM," and claims the benefit thereof.

BACKGROUND OF THE INVENTION

The present invention relates generally to multi-operational welding-type systems and, in particular, to an integrated system for performing the wide variety of tasks performed during structural welding processes.

Structural welding refers to the process of fabricating structural support structures used in a variety of applications. For example, structural welding often refers to the fabrication of products such as I-beams, girders, and the like using structural steel. The fabrication processes utilized during structural welding can vary greatly but, often, include welding, gouging, and grinding.

To perform these three primary processes of structural welding, an operator utilizes a welding-type power source, a welding torch, a gouging torch, a gouging air supply, and a grinder. Typically, the welding process is a metal inert gas (MIG) welding process, also referred to as gas metal arc welding (GMAW), or a flux core arc welding (FCAW) process and, in this case, a shielding gas supply and wire feeder are also utilized.

The welding-type power source, gas supplies, and transmission power receptacles that drive these processes are typically located at the perimeter of the work area and a variety of cords and cables span the distance from the power source, gas supplies, and power receptacles to the specific location of the workpiece where the fabrication process is being performed. This arrangement is advantageous because it allows an operator a relatively high degree of mobility to move about the workpiece, which may extend many feet. However, this arrangement also presents a number of impediments to efficient workflows.

For example, when switching between welding processes and gouging processes, it is typically necessary to change from a welding torch or gun to a gouging torch. However, generally, storage areas are located at the perimeter of the work area; and the operator is required to leave the workpiece to locate the required torch, contact tip, nozzle, or gouging carbon. As a result, operators often leave unused components at a location about the workpiece where they are susceptible to accidental damage.

Beyond simply switching between welding and gouging components, these two commonly employed processes typically require differing power parameters. As such, an operator must traverse the distance between the workpiece and the welding-type power source, where the controls for selecting current and voltage characteristics are located. Accordingly, some operators forego selection of proper power parameters for a given process and attempt to weld using gouging power parameters or vice versa.

As addressed above, structural welding processes often employ MIG welders. Accordingly, a wire feeder is utilized that drives a consumable electrode through a cable to a welding torch. Due to the need to avoid inordinately lengthy cables extending between the wire feeder and the welding gun and the need for an operator to adjust wire feeder parameters, the wire feeder is typically located near the workpiece. In an effort to maintain operator mobility about the workpiece, the wire feeder is often mounted on a wheeled cart or a beam extending on a rotatable axis. However, this configuration results in a significant potential for damaging the wire feeder.

First, as addressed above, a number of cables, including gas supply and power cables, extend from the welding power source, transmission power receptacle, and gas sources located at the periphery of the work area and, typically, become intertwined into "nests" around the workpiece. Beyond presenting an impediment to operator mobility, these cables present a significant impediment to moving the wire feeder using a wheeled cart and can even result in the cart being overturned.

Second, it is common for an operator to use the welding cable, which extends from the welding torch, as a "leash" through which to pull the wire feeder to a desired location or direction. Pulling the wire feeder about using the welding cable unduly stresses the wire feeder and the connection between the wire feeder and the welding system. Over time, these stresses can cause significant wear and damage to one or both of the wire feeder and welding cable. For example, the point of connection between the wire feeder and welding cable can become bent or otherwise deformed, which results in improper feeding of the wire into the welding cable. Furthermore, the power cable extending from the welding-type power source to the wire feeder can become damaged or disconnected as the wire feeder is pulled about.

Third, by arranging the wire feeder proximate to the workpiece, which may be large piece of structural steel or similar heavy metal, the wire feeder is subjected to an increased risk of damage from components in the surrounding environment. For example, when moving an I-beam through the work area, even a relatively small impact of the I-beam against the wire feeder can cause significant damage to the wire feeder.

Therefore, it would be desirable to have a system for performing structural welding processes that protects the components of the system against accidental damage and undue stresses. Furthermore, it would be desirable to have a system that provides ready access to user interfaces and other resources required by an operator during structural welding processes to improve work flow efficiency.

BRIEF SUMMARY OF THE INVENTION

The present invention overcomes the aforementioned drawbacks by providing an integrated structural welding system.

In accordance with one aspect of the present invention, a system is disclosed that includes a welding-type power source configured to deliver welding-type power for a variety of welding-type processes. The system also includes a gouging torch connected to the welding-type power source to receive welding-type power during a gouging-type process. A wire feeder is also connected to the welding-type power source to receive welding-type power during a welding-process. A controller is configured to coordinate operation of the wire feeder and the gouging torch to perform only one of the gouging-type process and the welding-type process at a given time.

In accordance with another aspect of the present invention, a portable wire feeder system is disclosed that includes a wire feeder configured to deliver a consumable wire for a welding-type process. A welding cable extends from the wire feeder to receive the consumable wire from the wire feeder and deliver the consumable wire to a weld. The portable wire feeder system includes a support structure supporting the wire feeder that includes at least one of a plurality of wheels and a pivotal connection to facilitate repositioning of the wire feeder. A strain protection system extends from the support structure to engage the welding cable to transfer forces applied to the welding cable to adjust a position of the wire feeder using the welding cable to the support structure.

In accordance with yet another aspect of the present invention, a portable support structure is disclosed that includes a support structure having a plurality of storage systems including a welding torch storage system configured to store a welding-type torch arranged at one end of a welding cable. The portable support structure also includes a cable path supported by the support structure and configured to receive a power cable extending from a welding-type power source to deliver welding-type power through the welding cable to the welding-type torch to perform a welding-type process. A strain protection system is also supported by the support structure to engage the power cable and secure the power cable in the cable path.

In accordance with still another aspect of the present invention, a multi-operational welding-type system is disclosed that includes a wire feeder connected to a remotely located welding-type power source to receive welding-type power to perform a welding-type process. A gouging torch is also connected to the remotely located welding-type power source to receive welding-type power to perform another welding-type process. A support structure is included that supports the wire feeder and includes a process selection switch configured to allow selection of only one of the welding-type process and another welding-type process at a given time.

In accordance with one aspect of the present invention, a wire feeder system is disclosed that includes a wire feeder configured to receive welding-type power from a welding-type power source to perform a welding-type process. The wire feeder system also includes a support structure surrounding at least a portion of the wire feeder and configured to permit the wire feeder to be moved independently from the welding-type power source. An auxiliary power outlet configured to deliver transmission-type power and/or a compressed air outlet configured to deliver a supply of compressed air is arranged on one of the wire feeder and the support structure.

In accordance with another aspect of the present invention, a welding-type system is disclosed that includes a welding-type power source configured to deliver welding-type power for a welding-type process. The welding-type power source is free of user interface devices configured to select operational parameters of the welding-type process. The welding-type system also includes a wire feeder connected to the welding-type power source to receive welding-type power during a welding-process and a user interface device arranged on the wire feeder that is configured to receive a user-selected welding parameter. A controller is configured to receive an indication of the user-selected operational parameter from the user interface device and control operation of the welding-type power source during the welding-type process based on the user-selected welding parameter.

In accordance with yet another aspect of the present invention, a welding-type system is disclosed that includes a control cable having a non-conductive exterior housing surrounding a conductive interior configured to conduct control signals between a welding-type power source and a remote control device. The welding-type system also includes a combined power and gas delivery cable that includes a welding-type power delivery cable having a non-conductive exterior housing surrounding a conductive interior configured to conduct welding-type power. The combined power and gas delivery cable also includes a gas delivery cable having a housing surrounding a gas flow path through which welding-type power cable extends. A removable housing is included that surrounds the combined power and gas delivery cable and the control cable.

In accordance with another aspect of the present invention, a welding-type system is disclosed that includes a control cable having a non-conductive exterior housing surrounding a conductive interior configured to conduct control signals between a welding-type power source and a remote control device. The welding-type system also includes a multiple-gas delivery cable that includes a first gas delivery cable having a first housing surrounding a first gas flow path through which a first gas flows. The multiple-gas delivery cable further includes a second gas delivery cable having a second housing surrounding the first gas flow path and a second gas flow path through which a second gas flows and is isolated from the first gas by the first housing. A removable housing is included that surrounds the multiple-gas delivery cable and the control cable.

In accordance with still another aspect of the present invention, a welding-type system is disclosed that includes a control cable having a non-conductive exterior housing surrounding a conductive interior configured to conduct control signals between a welding-type power source and a remote control device. A welding-type power delivery cable is included that has a non-conductive exterior housing surrounding a conductive interior configured to conduct welding-type power. Also, a first gas delivery cable is included that has a first housing surrounding a first gas flow path through which a first gas flows. In addition, a second gas delivery cable is included that has a second housing surrounding a second gas flow path through which a second gas flows and an auxiliary power cable is included that is configured to conduct transmission-type power. A removable housing surrounds the control cable, the welding-type power delivery cable, the first gas delivery cable, the second gas delivery cable, and the auxiliary power cable.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
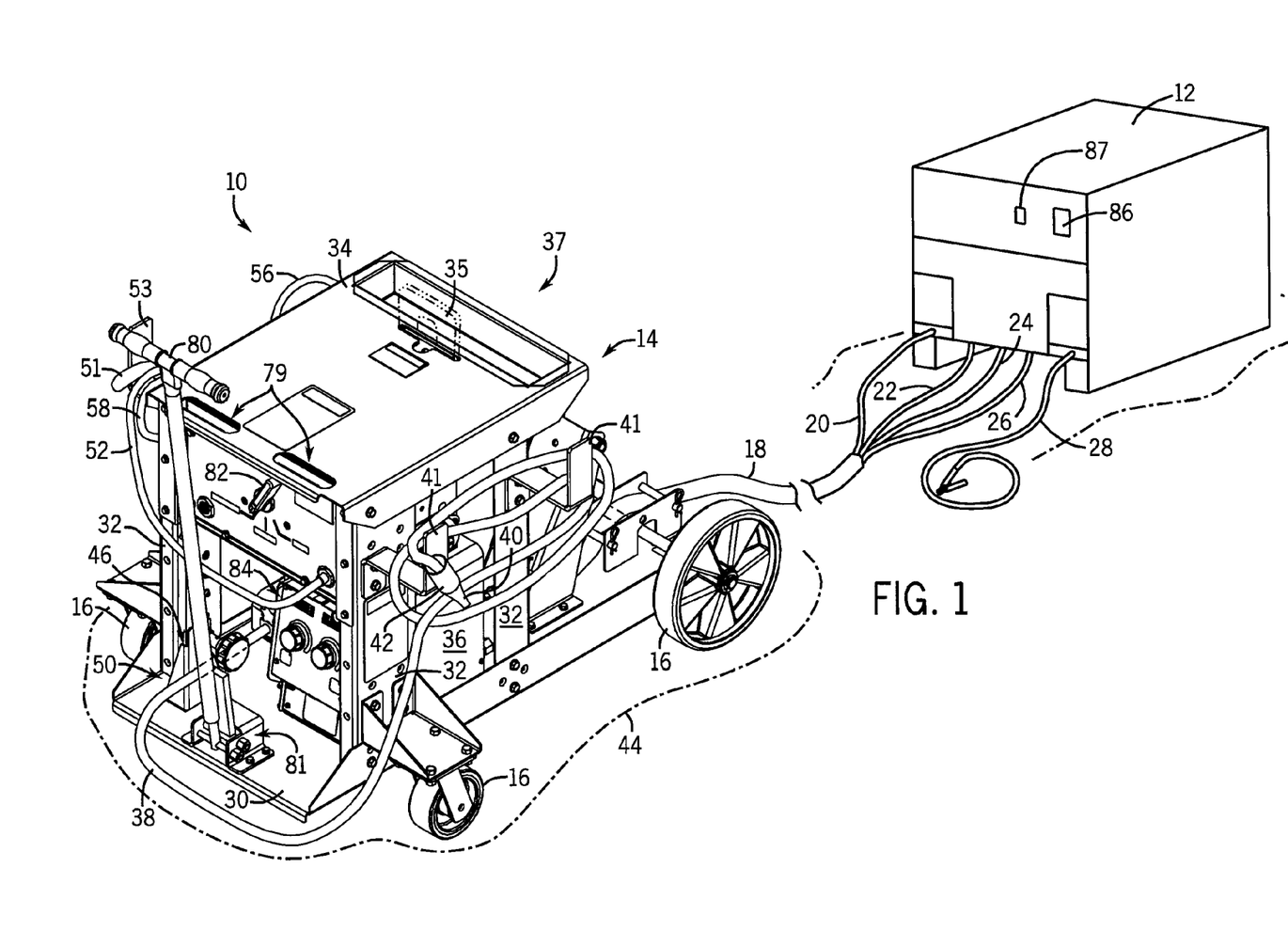
FIG. 1 is a perspective view of a multi-operational welding-type system in accordance with the present invention.

Referring now to FIG. 1, a multi-operational welding-type system 10 designed for fabrication processes, such as structural welding-type fabrication processes, is shown. As will be described, the multi-operational welding-type system 10, when configured for structural welding operations, is typically designed to perform welding processes, gouging-type processes, and grinding processes. While the illustrated multi-operational welding-type system 10 includes components specifically configured to perform metal inert gas (MIG) welding processes, gas metal arc welding (GMAW), or flux core arc welding (FCAW), the multi-operational welding-type system 10 may be designed to perform any of a variety of welding and welding-type processes, such as tungsten inert gas (GTAW) welding processes, stick welding processes or shielding metal arc welding processes (SMAW), plasma cutting processes, and the like. Accordingly, reference to welding-type systems, welding-type components, and welding-type power may include any of a wide variety of welding systems, plasma cutting systems, induction heating systems, and the like.

Regardless of the specific components or the particular processes to be performed, the multi-operational welding-type system 10 includes a welding-type power source 12 and a support structure 14, typically formed as a cart, carriage, or the like, that is independently movable from the welding-type power source 12. To facilitate movement, the support structure 14 is supported on a plurality of wheels 16 and is connected to the welding-type power source 12 through a series of cables that, as will be described, are advantageously arranged inside a removable housing to from a single umbilical cord 18. Specifically, as will be described, the umbilical cord houses a plurality of cables that, for example, may include a welding power cable 20, an auxiliary power cable 22, one or more gas supply cables 24 (e.g., a shielding gas hose and an air supply hose), and a control cable 26. As will be described, the control cable 26 allows the selection and control of a variety of process from the user interfaces included at the support structure 14. To facilitate such control, it is contemplated that a variety of conductive paths may be included in the control cable 26 and, in some cases, additional conductive cables, such as a voltage sensing lead, may be included in the umbilical cord 18. While it is contemplated that the umbilical cord 18 may not include a grounding cable 28 to facilitate maximum mobility of the support structure 14, in some cases, the grounding cable 28 may be included in the umbilical cord 18. Similarly, in some cases the welding power cable 20 or auxiliary power cable 22 may be removed from the umbilical cord 18.

The support structure 14 includes a tray 30 supported on the plurality of wheels 16. A plurality of legs 32 extends up from the tray 30 to support a substantial planar worksurface 34 thereabove. The worksurface 34 provides a preferably flat surface on which an operator can arrange documents, additional or replacement components, and the like. A retractable lift eye 35 may be included. In this regard, the lift eye 35 may be extended above the worksurface 34 when needed and then repositioned under the worksurface 34 when not in use.

A wire feeder 36 is supported on the tray 30 and is arranged between the plurality of legs 32. In this regard, the legs 32, as well as the worksurface 34, form a cage surrounding the wire feeder 36 that protects the wire feeder 36 from accidental damage. As is conventional in MIG and other welding-type systems, a welding cable 38 extends from the wire feeder 36 to a welding torch 40. The support structure 14 includes a pair of cable supports 41 around which the welding cable 38 can be wrapped and holster 42 configured to receive the welding torch 40 for storage in a suspended position above a floor 44.

Figure 5:
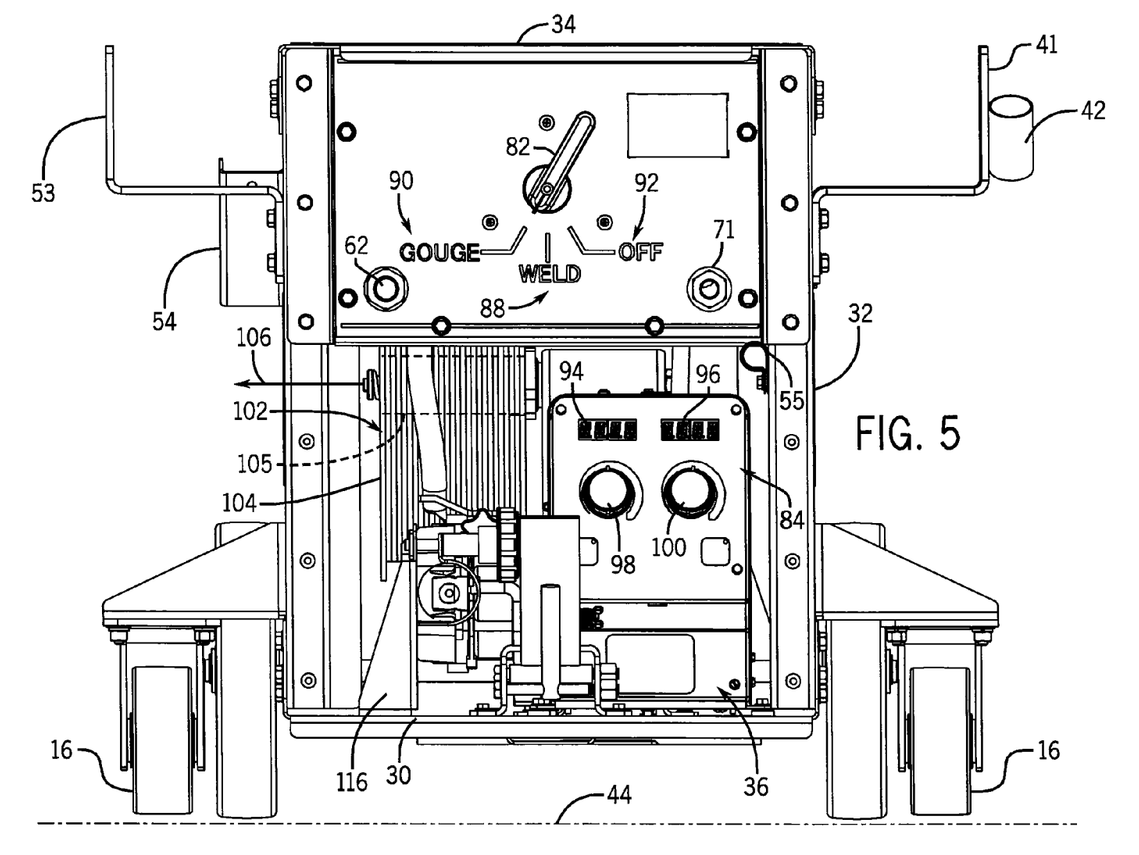
FIG. 5 is a front elevational view of a wire feeder system and associated support structure of the multi-operational welding-type system of FIG. 1.
Figure 6:
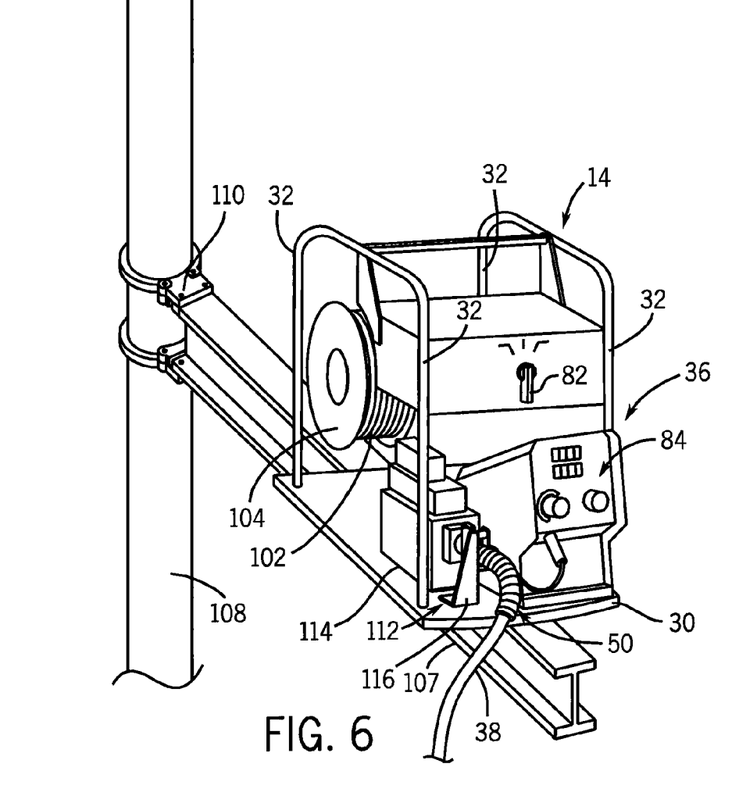
FIG. 6 is a perspective view of wire feeder system and associated support structure arranged in a beam mounting configuration in accordance with the present invention.

The support structure 14 includes a strain relief or protection system 46 that is designed to protect the wire feeder 36 and the connection between the wire feeder 36 and welding cable 38 from damage caused by forces exerted on the wire feeder 36 and welding cable 38 when the support structure 14 is moved by pulling or otherwise moving the welding cable 38. Specifically, referring to FIG. 2, one configuration of a strain protection system 46 is illustrated in detail. In this configuration, the welding cable 38 is designed to extend proximate to a leg 32 of the support structure 14. A bracket 47 is mounted to the leg 32 through a pivot connection 48 and a removable connection 49. Alternatively, the strain protection system 46 may include a bracket 116 that stands independently from the legs 32, such as illustrated in FIGS. 1, 5, and 6. In any case, the removable connection 49, for example, a threaded shaft and nut, can be released to allow the bracket 47 to pivot about the pivot connection 48. The welding cable 38 is arranged under the bracket 47 and, thereby, affixed to the leg 32 when the removable connection 49 is reengaged.

By fastening the welding cable 38 against the leg 32 of the support structure 14 or other fixed structure, an operator can use the welding cable 38 to reposition or move the support structure 14 without damaging the wire feeder 36 of FIG. 1, or the connection point between the welding cable 38 and the wire feeder 36. That is, an operator can safely pull on the welding cable 38 to move the support structure 14 on the associated wheels 16 and the strain protection system 46 serves to transfer the forces that would otherwise be applied to the wire feeder 36 and connection point between the wire feeder 36 and welding cable 38 to the support structure 14, which is specifically designed to withstand such forces. Therefore, the strain protection system 46 and support structure 14 work in concert to protect the wire feeder 36 against damage.

Figure 2:
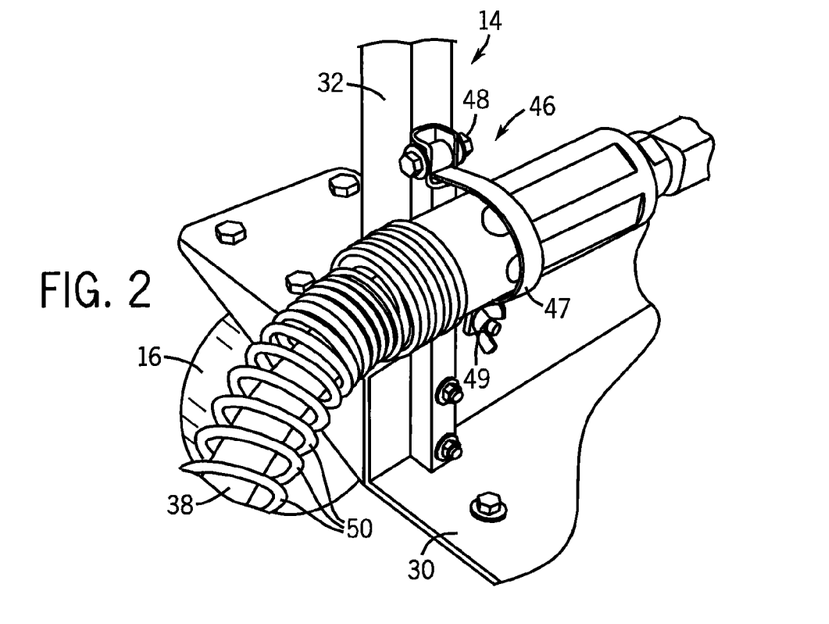
FIG. 2 is a partial perspective view of a strain protection system in accordance with the present invention.

In addition to the strain protection system 46, it is contemplated that a cable protection system 50 may be included to protect the welding cable 38 from being damaged, in particular, when pulled or moved in an effort to move the support structure 14. The cable protection system 50 is formed from a substantially rigid material, such as a metal, that extends from the strain protection system 46 along a portion of the welding cable 38. The cable protection 50 is designed to keep the welding cable 38 from being unduly stressed or pulled into a sharp angle that could damage the welding cable 38 or the consumable wire being fed therethrough. That is, the cable protection system 50 is designed to work in concert with the strain protection system 46 by dispersing the forces that would otherwise be applied to the feeder 36 and connection to the weld cable 28 when pulling on the weld cable 38 to move the support structure 14.

Figure 3:
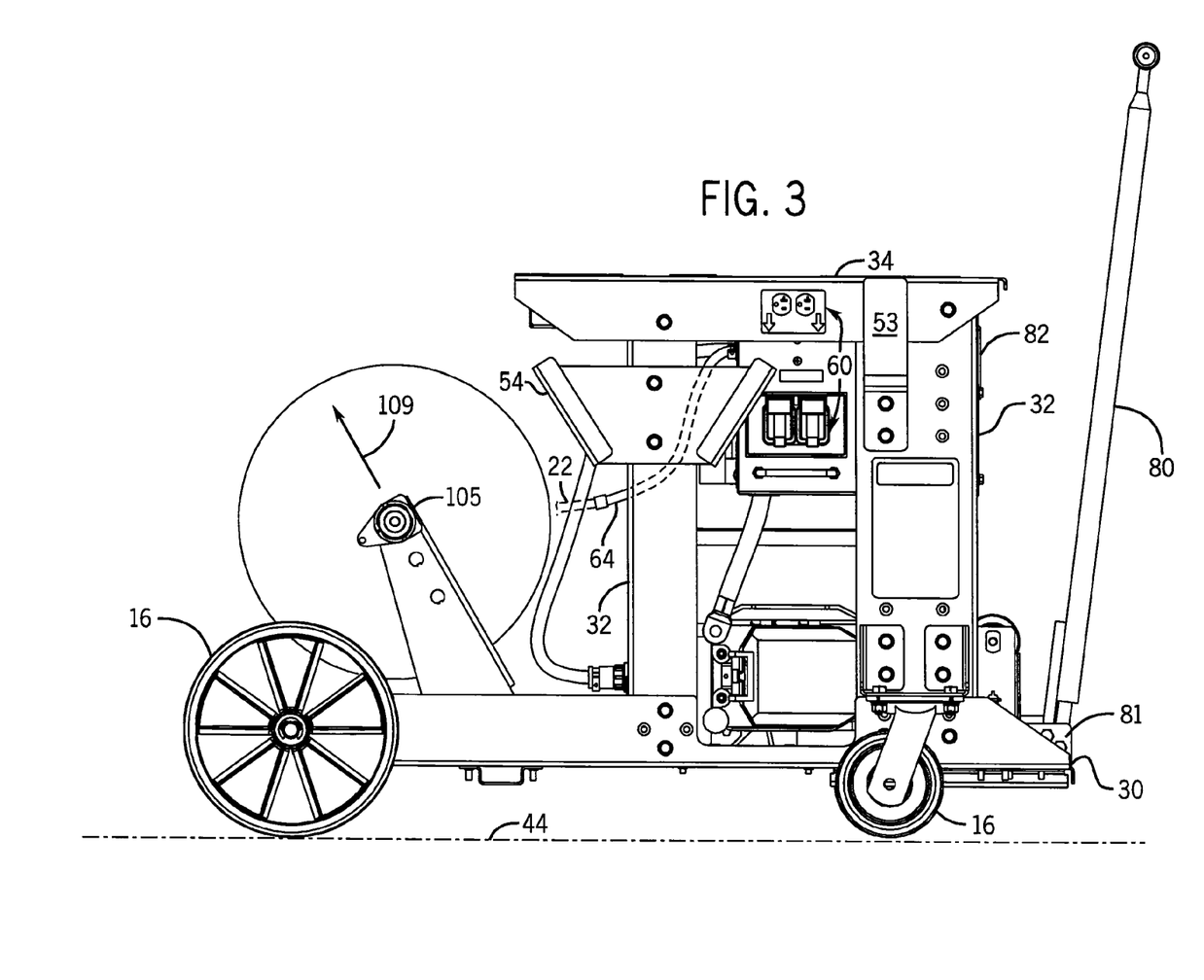
FIG. 3 is a partial side-elevational view of the wire feeder and associated support structure of FIG. 1 including auxiliary power outlets in accordance with the present invention.

Referring again to FIG. 1, beyond the wire feeder 36 and associated welding components, the support structure 14 is designed to support, organize, and store a variety of components and devices. A gouging torch 51 and associated gouging cable 52 are also supported by the support structure 14. As best illustrated in FIG. 3, another cable support 53 extends from the support structure 14 to receive the gouging torch 51 and gouging cable 52 in a coiled arrangement similar to that described above with respect to the welding torch 40 and welding cable 38. Additionally or alternatively, a grinder holster 54 may be included. The gouging cable 52 connects the gouging torch 51 to the support structure 14 through a gouging power cable connection 55, as shown in FIG. 5, that secures the gouging cable 52 thereto to protect the gouging cable 52 from being pulled from a gouging-power connection (not shown) through which power is delivered from the welding-type power source 12 to the gouging torch 51 to perform a gouging or gouging-type process. Air pressure is supplied to the gouging torch 51 through air supply connection 71 in FIG. 5.

Additionally, a grinder 56 and associated grinding cable are also supported by the support structure 14, for example, through the holster 54 illustrated best in FIG. 3. Like the gouging cable 52, the grinding cable 58 connects the grinder 56 to the support structure 14. Specifically, as will be described, the grinding cable connects the grinder 56 to either a compressed air receptacle or auxiliary power receptacle to receive either compressed air or transmission-type power, respectively, to perform a grinding process.

In particular, referring now to FIG. 3, a leg 32 of the support structure 14 includes a plurality of input and output connection points. An auxiliary power output receptacle 60 and is included. The auxiliary power output receptacle 60 is configured to deliver transmission-type AC power to drive devices designed to receive traditional 50 or 60 Hz AC power, for example, some grinders 56. As illustrated in FIGS. 1 and 5, a compressed air outlet receptacle 62 is configured to deliver compressed air to drive pneumatic devices, such as some grinders 56. Accordingly, the support structure 14 includes integrated output receptacles 60, 62 that are designed to provide a source of driving power for a wide variety of devices. By providing the integrated output receptacles 60, 62, the long cords that are typically used to connect devices to remotely located power and compressed air sources are no longer necessary. In fact, retractable cables may be coupled with the integrated output receptors 60, 62 to further facilitate cable management by retracting cables back into the support structure 14 when unneeded. When coupled with the above-described storage devices 41, 42, 53, 54 cable management and an organized work environment are readily facilitated.

Figure 4:
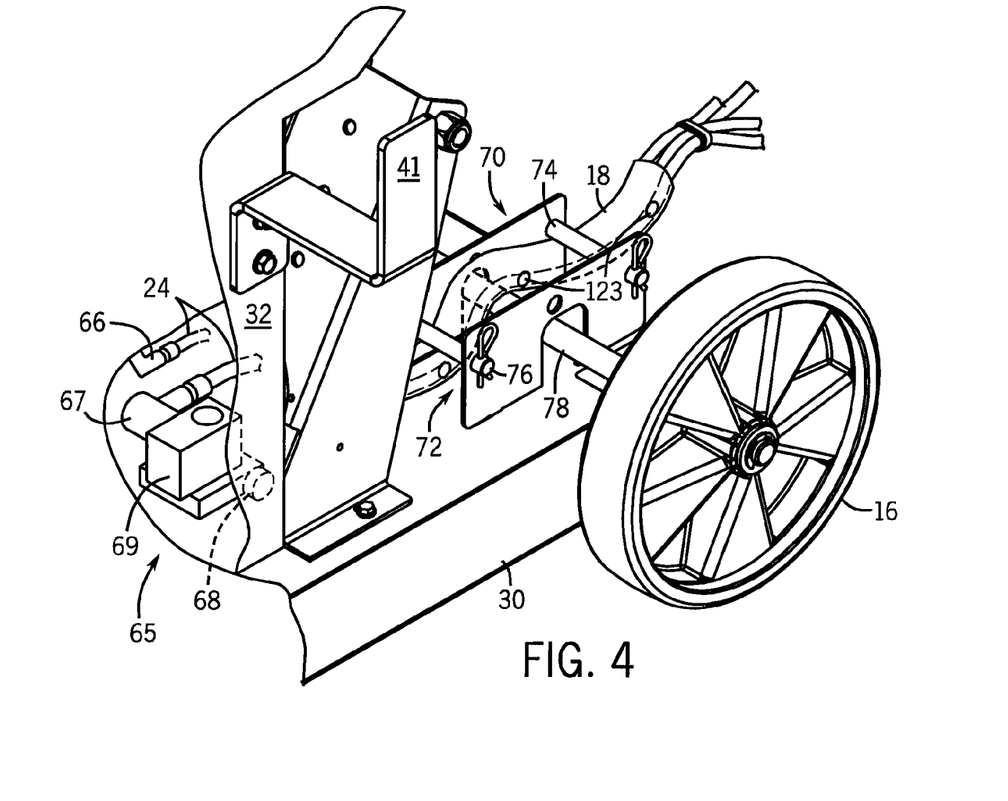
FIG. 4 is a partial perspective view of another strain protection system and an air distribution system in accordance with the present invention.

A plurality of input connection points are also provided that are designed to receive the welding power cable 20, auxiliary power cable 22, one or more gas supply cables 24, and control cable 26. In particular, as shown in FIG. 3, a plug or similar coupling device 64 is provided that is designed to engage the auxiliary power cable 22 to receive the above-described transmission-type AC power carried by the auxiliary power cable 22 and deliver the power to the auxiliary power output receptacle 60. Additionally, as illustrated in FIG. 4, a gas distribution system 65 and shielding gas coupling 66 are included. The couplings 65, 66, which may be quick-connection couplings, are designed to receive the above-described one or more gas supply cables 24, specifically, a compressed air coupling and a shielding gas cable, respectively. As will be described below with respect to FIG. 7, these cables may be individual cables that are dedicated to carrying either the shielding gas or compressed air or these cables may be part of a composite cable designed to carry multiple gas and/or power connection.

It is contemplated that one or more valves may be included to regulate the flow and distribution of gasses from the couplings 65, 66. For example, the gas distribution system 65 is formed as a T-link having a first output 67 that provides a continuous flow of compressed air to the "work air" or auxiliary air output 62 on the face of the support structure 14. The gas distribution system 65 also has a second output 68 having a valve 69 arranged therein to control the flow of air to a gouge air output 71 that, as illustrated in FIG. 5, is also located on the face of the support structure 14. The valve 69 is configured to coordinate the flow of air to the gouge air output 71. Specifically, the valve 69 may be controlled by the wire feeder 36 or, as will be described, an operational selection switch to selectively direct gas to the gouging torch 51 only when a gouging process is selected. Alternatively or additional, the valve 69 may be coupled to a dedicated user-interface device, beyond the traditional valve and user interface that the gouging torch 51 typically includes, such as a user interface integrated into the support structure or other area. Furthermore, it is contemplated that multiple valves may be integrated into the wire feeder 36. For example, a valve for controlling the flow of shielding gas may be integrated into the wire feeder 36.

Continuing with respect to FIG. 4, another strain relief/protection system 70 is provided that is advantageous for protecting the connection of the welding power cable 20, auxiliary power cable 22, one or more gas supply cables 24, and control cable 26 with the wire feeder 36, and support structure 14. The strain protection system 70 includes a cable path 72 that extends up from the tray 30 of the support structure 14 and is configured to receive the umbilical cord 18 and cables 20, 22, 24, 26 arranged therein. A plurality of parallel pins 74, 76 extend across the cable path 72 along with an axel 78 of the wheels 16 to form a tortured path through which the umbilical cord 18 is routed. As illustrated, the umbilical cord 18 is arranged to extend under the first pin 74, over the axel 78, and under the second pin 76. However, it is contemplated that the umbilical cord 18 may be arranged in other configurations. Furthermore, although the pins 74, 76 and the axel 78 are aligned at a common distance above the tray 30, it is contemplated that the pins 74, 76 and axel 78 may be offset to increase or decrease the degree of torture along the cable path 72. Also, the axel 78 may be replaced by a pin. Further still, though not illustrated, it is contemplated that the pins 74, 76 and any additional pins may be mounted perpendicularly, with the axle removed from the system, and the umbilical cord 18 routed through the tortured path of pins and covered with a plate or similar securing device. In any case, the strain protection system 70 serves to lock the umbilical cord 18 and the individual cables 20, 22, 24, 26 arranged therein in the cable path 72. Therefore, when the support structure 14 is moved about, the cables 20, 22, 24, 26 are not inadvertently disengaged from the connection points including, for example the welding power cable, shielding hose, air hose, control cable, and auxiliary power cable.

Beyond the above-described storage components, including the tray 30, the holsters 42, 54, and the cable supports 41, 53, it is contemplated that the support structure 14 may include a drawer or tray or other storage compartments. As described above, the worksurface 34 provides one storage area that can be used to store documents, notes, replacement parts, and the like during operation. On the other hand, a drawer may be designed for longer-term storage of such resources. For example, the drawer may be used for overnight storage or may house resources that require additional protection from the work environment during operation. Additionally, it is contemplated that the drawer may be lockable.

One or more handles 79 may be included that are integrated into the worksurface 34. Additionally or alternatively, as shown in FIGS. 1 and 3, a T-handle 80 may be included that is supported on the tray 30. It is contemplated that the T-Handle 80 may include a base 81 that is spring loaded to bias the T-handle 80 into an upright position, such as illustrated in FIG. 1. Additionally or alternatively, the handle may be integrated into the worksurface 34.

The support structure 14 includes at least one user-interface device 82. As illustrated, the user-interface device 82 may include a multi-position switch or dial but may include a variety of other interface components, such as slidable switches, digital interfaces, and the like. The user-interface device 82 is designed to cooperate with the wire feeder 36 to control operation of the multi-operational welding-type system 10. Specifically, the user-interface device 82 and, as will be described, interface devices 84 included on the wire feeder 36 are designed to control operation of the multi-operational welding-type system 10. Accordingly, the welding-type power source 12 is substantially free from control or interface devices.

It is contemplated that the welding-type power source 12 may include only an "ON/OFF" switch 86 and a breaker switch 87. In this regard, unlike conventional welding-type power sources, the welding-type power source 12 of the multi-operational welding-type system 10 is preferably free of traditional interface devices that allow for the selection of operational parameters, such as power characteristics and the like. Instead, all user-selected parameters and control operations are selected using the user interfaces 82, 84 of the wire feeder 36 and support structure 14.

The breaker switch 87 is included to discontinue the delivery of power from the welding-type power source 12, should the current being drawn from the welding-type power source 12 exceed a predetermined threshold. Accordingly, an operator performing, for example, a grinding process can drive the process without needing to monitor power-draw tolerances. Rather, should a process draw an excess of current, the breaker switch 87 will automatically trip and discontinue the supply of the from the welding-type power source 12. To re-enable the supply of power from welding-type power source 12, an operator need only move the breaker switch 87 from the tripped position.

In the illustrated configuration, the user-interface device 82 is a mechanical three-position switch that can be moved between three positions including a "welding" position 88, a "gouging" position 90, and an "off" position 92. When the user-interface device 82 is moved to one of the positions 88, 90, 82, the wire feeder 36 and, more particularly, a controller generally designated by arrow 37 is disposed in the support structure. The controller 37 may be integrated in the wire feeder 36, but also may be located elsewhere. In operation, the controller 37 identifies the current position of the switch and, as will be described, controls the operation of the multi-operational welding-type system 10. As described above, the welding-type power source 12 is preferably free of user-interface devices and, thus, the user-interface devices 82, 84 of the support structure 14 and the wire feeder 36 act as the primary control and interface devices.

Specifically, the controller 37 monitors the position of the user-interface device 82 to determine the mode of operation. As stated above, the controller 37 is preferably integrated within the wire feeder 36 but may be arranged in any of a variety of locations, such as in the support structure 14. That is, based on the current position of the user-interface device 82, the controller 37 commands the welding-type power source 12 by sending control commands over the control cable 26 that cause the welding-type power source 12 to deliver power to the welding torch 40 for a desired welding process.

Referring now to FIG. 5, the operational parameters, including power parameters, for a desired gouging or welding process are entered through the user interface 84 of the wire feeder 36. The user interface 84 of the wire feeder 36 includes a first display 94, a second display 96, an output selection dial 98, and a wire speed or wire-diameter selection dial 100. Alternatively, the user interface 84 may be arranged in a side-by-side arrangement. The first display 94 is configured to display voltage information relevant to the currently selected process and the second display 96 is configured to display wire speed and/or amperage information relevant to the currently selected process. That is, the displays 94, 96 are configured to display information based on the currently selected process. The output selection dial 98 and the wire speed or wire-diameter selection dial 100 are configured to quickly and easily allow an operator to select the operational parameters of a given process. For example, in accordance with one embodiment that will be described below, the output selection dial 98 and the wire speed or wire-diameter selection dial 100 may also provide a simplified, synergic parameter selection process.

For example, referring now to FIGS. 1 and 5, when the operator desires to perform a welding process, the operator moves the user-interface device 82 to the welding position 88. The controller 37 identifies the current position of the user-interface device 82 and controls the components of the multi-operational welding-type system 10 to perform the welding-type process. In particular, the controller 37 directs the power delivered from the welding-type power source 12 to the welding torch 40. More particularly, power is directed to the welding torch 40 and no power is delivered to the gouging torch 51. In this regard, the controller 37 is configured to coordinate operation of the welding torch 40 and the gouging torch 51 to perform only a welding process and not a gouging process.

To aid the operator in selecting the proper operational parameters, the operational parameters used during the previous welding process are displayed on the first display 94 and the second display 96. In particular, the first display 94 displays the voltage used during the previous welding process. Similarly, the second display 96 displays the wire feed speed used during the previous process. If changes to these operational parameters are desired, the operator uses the output selection dial 98 to adjust voltage, and dial 100 to adjust the wire feed speed.

Alternatively, the operator can use the wire-diameter selection dial 100 to adjust the diameter of wire 102 being used during the welding process and allow the controller 37 to select the proper operational parameters. As described above, it is contemplated that the multi-operational welding-type system 10 is particularly well suited for structural welding/fabrication applications. When performing structural welding processes, only a few types of consumable wire 102 are typically used. Specifically, either AWS Classification E71T-1 or E70T-1 welding wire are commonly employed. To simplify the selection of operational parameters, it is contemplated that the wire-diameter selection dial 100 may be used to choose between these two common wire diameters or other wire types/diameters. Once the proper diameter has been selected using the wire-diameter selection dial 100, the wire feeder 36 automatically selects the proper voltage and wire feed speed and displays the operational parameters on the displays 94, 96.

As illustrated in FIG. 5, it is contemplated that the support structure 14 may be designed to support a spool 104 of consumable wire 102. This further facilitates the portability of the support structure 14 by integrating the wire source 102, 104 therein. It is contemplated that the support structure 14 may include a spool arm 105 that extends above the tray 30 of the support structure 14. While the spool arm 105 may be fixed, it is contemplated that the spool arm 105 may be configured to telescope outward along arrow 106 to an extended position to facilitate placement of the spool 104 on the spool arm 105. Thereafter, the arm may be retracted back into the operational position shown in FIG. 5 to deliver wire 102 from the spool 104 to the wire feeder 36 during the welding process. Furthermore, though not illustrated it is contemplated that the support structure 14 may be configured to receive a spool 104 of consumable wire 102 in a horizontally mounted arrangement. In this regard, the overall height of the support structure 14 may be further reduced and portability and maneuverability further increased.

Further still, as illustrated in FIG. 3, it is contemplated that the spool arm 105 may telescope vertically along arrow 109. Accordingly, the spool arm 105 may be raised to enable an individual to load the spool 104 onto the spool arm 105 without needing to bend down to the level of the spool arm 105. That is, instead the spool arm 105 is elevated to the level of a spool 104 being held by an individual. Therefore, the process of loading a spool 104 onto the spool arm 105 is less strenuous.

Once the operational parameters are selected, the operator uses the welding torch 40 to initiate the welding process, whereby the wire feeder 36 controls the delivery of power from the welding-type power source 12 to the welding torch 40 using commands communicated over the control cable 26 and draws consumable wire 102 from the spool of wire 104 and delivers the consumable wire 102 to the welding torch 40 to effectuate the welding process according to the selected operational parameters. During the welding process the display 96 is configured to display amperage information, specifically, the number of amps being drawn during the welding process. Likewise, the display 94 is configured to display actual voltage during the welding process.

When the operator desires a change from a welding process using the welding torch 40 to a gouging process (or other welding process, such as stick welding) using the gouging torch 51, the user-interface device 82 is moved from the welding position 88 to the gouging position 90. While, generally, it is contemplated that the gouging torch 51 will be used for gouging processes, it is contemplated that the connection point for the gouging torch 51 may be used for other processes, such as stick welding. In this regard, reference to gouging processes or gouging-type processes or processes performed using the gouging torch 51 may also include other processes, such as stick welding. During the gouging process the display 96 is configured to display amperage information, specifically, the number of amps being drawn during the gouging process. Likewise, the display 94 is configured to display actual voltage during the gouging process.

The positional change of the user-interface device 82 is identified by the controller 37 and causes the controller 37 to discontinue the supply of power to the welding torch 40 and direct power from the welding-type power source 12 to the gouging torch 51. In this regard, the controller 37 is configured to coordinate operation of the wire feeder 36, the power source 12, and the gouging torch 51 to perform only one of the gouging process or the welding-type process at a given time.

In a manner similar to the selection of operational parameters for a welding process, the operator enters desired operational parameters for the gouging process through the user interface 84 of the wire feeder 36. As with the selection of the welding process, operational parameters used during a previous gouging process are loaded and displayed on the displays 94, 96. Specifically, the first display 94 displays voltage information and the second display 96 displays the percentage of power source output to be delivered to the gouging torch 51. Should changes be desired, the operator adjusts the displayed operational parameters using the output selection dial 100. During the gouging process, the second display 96 switches from displaying the percentage of power source output to be delivered to the gouging torch 51 to displaying the number of amps being drawn during the gouging process. In accordance with one embodiment, when a process, such as a gouging or welding process is discontinued, the display continues to display the information displayed during the process for a period of time. For example, when the gouging process is discontinued, it is contemplated that the second display 96 continues to display the number of amps being drawn during the gouging process for a period of time, for example 5 seconds.

The above-described system allows an operator to quickly and easily switch between welding processes and gouging processes without needing to constantly monitor or adjust operational parameters. Furthermore, when changes to the operational parameters or previous operational parameters are desired, the operator is not required to traverse the distance back to the welding-type power source 12, but can make all desired changes, including switching between the isolated processes of welding and gouging, directly from the remote location of the support structure 14. However, it is contemplated that the above-described user interface 84 of the wire feeder 36 may be foregone in favor of a traditional wire feeder user interface.

When the operator has completed the welding and gouging process, the user-interface device 82 is moved to the off position 92, whereby, the controller 37 causes the welding-type power source 12 to discontinue the delivery of welding or gouging power and enter a full "off" mode. That is, moving the user-interface device 82 into the off position 92 causes the welding-type power source 12 to turn "off" in a manner similar to using the "ON/OFF" switch 86. Accordingly, the "ON/OFF" switch 86 acts as a secondary, manual switch to turn the welding-type power source to "off". Additionally, if the user-interface device 82 is moved from the welding position 88 or gouging position 90 while a welding or gouging process is being performed and, thus, the welding torch 40 or gouging torch 51 is drawing power from the welding-type power source 12, the controller 37 controls the welding-type power source to enter standby mode and discontinue the delivery of power.

In many cases, an operator may move the user-interface device 82 to the off position 92 when additional processes, such as grinding processes, are to be performed. As described above, the support structure 14 includes integrated outputs 60, 62 that provide electrical and pneumatic power, respectively, to auxiliary devices, such as grinders 56.

When the welding, gouging, and grinding processes are complete, the above-described storage elements allow an operator to quickly and easily store all of the components of the multi-operational welding-type system 10. Accordingly, cables, torches, consumables, and the like are not left spanning across a work area where they may cause an impediment to efficient workflow or may become damaged. Rather, all cables and components can be quickly and easily stored on the support structure 14 and only the umbilical cord 18 and grounding cable 28 are left to span the distance between the welding-type power source 12 and the support structure 14.

Referring now to FIG. 6, it is contemplated that the support structure 14 may not include wheels and, instead, be configured to be mounted on a horizontal beam 107. Though illustrated as including a spool 104 of consumable wire 102, it is also contemplated that this beam-mounted embodiment may utilize a drum of wire that would be located on the floor below the horizontal beam 107.

The horizontal beam 107 is connected to a vertical beam 108 through a pivot axis 110 that allows the horizontal beam 107 and support structure 14 to be rotated and repositioned. To facilitate moving the horizontal beam 107 and support structure 14 about the pivot axis 110, it is contemplated that a strain relief/protection system is included. The strain protection system may be arranged as described above with respect to FIGS. 1 and 2. On the other hand, it is contemplated that another strain protection system 112 may be used. This strain protection system 112 includes a base 114 that extends under a portion of the wire feeder 36. A bracket 116 extends up from the base 114 to engage the welding cable 38 proximate to the connection of the welding cable 38 to the wire feeder 36. Accordingly, as described above, this strain protection system 112 protects the wire feeder 36 and the connection between the welding cable 38 and wire feeder 36 from forces placed on these components when the welding cable 38 is used to adjust the position of the support structure 14 and the potential damage that those forces can cause. Accordingly, a strain protection system 112 is provided that protects the wire feeder 36 and the connection between the welding cable 38 and wire feeder 36 from damage without incorporating the legs 32 into the strain protection system 112.

This configuration may be particularly advantageous for beam mountings of the support structure 14, where the wire feeder 36, due to the elevated position, is less prone to accidental damage and, thus, smaller legs 32 that afford less protection but reduce manufacturing costs and the overall weight of the support structure 14 may be used. To this end, it is contemplated that the above-described wheels and brackets may be removable to facilitate beam mounting.

Figure 7:
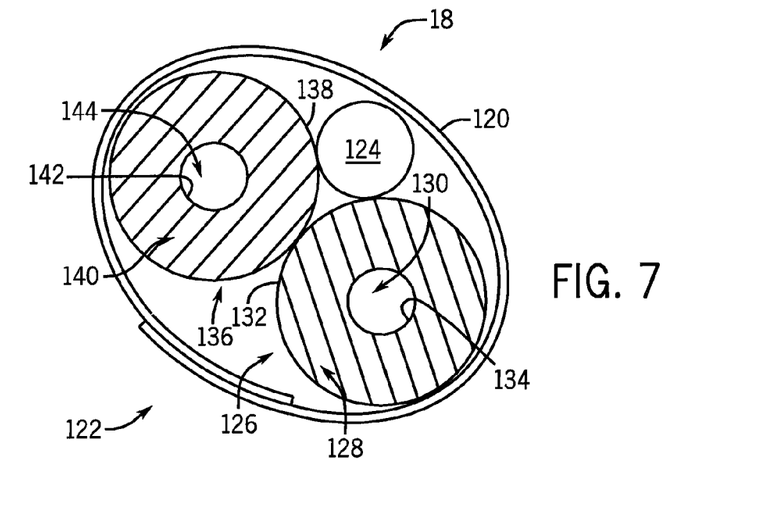
FIG. 7 is a cross-sectional view of an umbilical cord cable system of FIG. 1 including multi-path cables in accordance with the present invention.

Referring now to FIG. 7, the umbilical cord 18 is shown in further detail. As generally described above, the umbilical cord 18 includes a housing 120 designed to removably surround a plurality of individual cables. In this regard, the housing 120 may be formed of a semi-ridged material, such as rubber or the like, and include an overlapping portion 122 that can be used to remove or gain access to the cables arranged within the housing 120. Alternatively, the housing may be made of any of a variety of other materials, such as cloth, leather, or the like, that are less ridged. In this case, the overlapping portion 122 may include snaps 123, such as illustrated in FIG. 4, or other securing mechanisms that can be used to enclose the housing 120 about the cables arranged therein, while still allowing ready access to the cables.

As described above, the cables arranged within the housing 120 may be individual cables, such as illustrated by individual cable 124. The individual cable 124 may be designed to carry electricity or gas to operate as any of the above-described cables 20, 22, 24, 26, 28. However, in some cases, it may be advantageous to utilize cables that include multiple electrical and/or gas flow paths. For example, as illustrated in FIG. 7, one such cable 126 may include first and second paths 128, 130.

The first path 128 is surrounded by a first housing 132 and the second path 130 is surrounded by a second housing 134. It is contemplated that the first and second paths 128, 130 may be configured to provide a flow path for either welding-type power or gas.

In accordance with one embodiment, the first path 128 and first housing 132 form a welding-type power delivery cable. In this case, the first housing 132 is a non-conductive housing and the first path 128 is a conductive path configured to conduct welding-type power. The second path 130 may be another conductive path or may be a gas flow path. In either case, the first and second path 128, 130 are isolated.

In accordance with another embodiment, a multiple-gas delivery cable 136 may be included. Like the above-described welding-type power delivery cable, the multiple-gas delivery cable 136 includes a first housing 138 that surrounds a first path 140, which is a hollow flow path for gas. The multiple-gas delivery cable 136 also includes a second housing 142 surrounding a second path 144 that may be another hollow gas flow path or may be a conductive flow path. In either case, the first and second path 140, 144 are isolated.

Theses cables 126, 136 may be particularly advantageous when utilized with systems such as the above-described umbilical cord 18. That is, the cables 126, 136, by combining multiple paths 128, 130, 140, 144 into an integrated cable, reduces the number of individual cables arranged in the umbilical cord 18. For example, the umbilical cord 18 of FIGS. 1 and 4 may simply include a control cable having a non-conductive exterior housing surrounding a conductive interior configured to conduct control signals between a welding-type power source and a remote control device and one or more integrated gas and/or power delivery cables. Furthermore, although the above-described example of an integrated gas and/or power cable includes only a first path and a second path, it is contemplated that three, four, or even more paths may be included in a single integrated cable.

Therefore, the above described system and method provides an integrated structural welding system that protects the components of the system against accidental damage and undue stresses. Furthermore, the above-described system and method provides ready access to user interfaces and other resources required by an operator during structural welding processes to improve work flow efficiency.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A system comprising: a welding-type power source configured to deliver welding-type power for a variety of welding-type processes; a gouging torch connected to the welding-type power source to receive welding-type power during a gouging-type process; a wire feeder connected to the welding-type power source to receive welding-type power during a welding-process; and a controller configured to coordinate operation of the wire feeder and the gouging torch to perform only one of the gouging-type process and the welding-type process at a given time, wherein the wire feeder includes a plurality of user-interface devices configured to select operational parameters for the welding-type process and the gouging-type process, wherein the controller is arranged in the wire feeder and is configured to receive selected operational parameters from the plurality of user interface devices and control the welding-type power source to deliver welding-type power based on the selected operational parameters for the welding-type process and the gouging-type process.

2. A system comprising: a welding-type power source configured to receive an input power and deliver welding-type power; a gouging torch connected to the welding-type power source to receive a gouging power during a gouging-type process; a wire feeder connected to the welding-type power source to receive welding-type power during a welding process; and a controller configured to coordinate operation of the welding-type power source to provide only one of the gouging power and the welding-type power at a given time; wherein the controller is located remotely from the welding-type power source and wherein the welding-type power source is free of user interface devices configured to select operational parameters.

* * * * *